Figure 1:
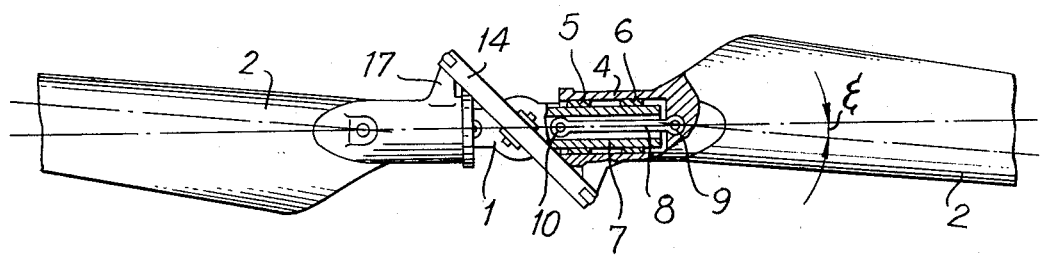

United States Patent
Nekrasov et al.

[15] 3,637,321
[45] Jan. 25, 1972

[54] TAIL ROTOR OF A HELICOPTER

[72] Inventors: Andrei Vladimirovich Nekrasov, ulitsa Stromynka 23, kv. 136a; Lev Naumovich Grodko, Pokrovsky balvar, 14/6, kv. 14, both of Moscow, U.S.S.R.

[22] Filed: Oct. 2, 1969

[21] Appl. No.: 863,156

[30] Foreign Application Priority Data

Dec. 4, 1968 U.S.S.R..............................1286831

[52] U.S. Cl..............................416/123, 416/131, 416/136, 416/168
[51] Int. Cl..............................B64c 27/76
[58] Field of Search..............416/131, 134, 136, 123.9, 168

[56] References Cited

UNITED STATES PATENTS

| | | | |
|---|---|---|---|
| 2,499,314 | 2/1950 | Hunt | 416/131 |
| 2,809,506 | 10/1957 | McDaniel | 416/135 X |
| 3,232,348 | 2/1966 | Jarosch | 416/114 X |
| 3,448,946 | 6/1969 | Nagatsu | 416/123 X |
| 3,518,025 | 6/1970 | Schmidt et al. | 416/136 X |
| 3,520,637 | 7/1970 | Tobey | 416/135 |

FOREIGN PATENTS OR APPLICATIONS 957,314   5/1964   Great Britain..................416/131

*Primary Examiner*—Everette A. Powell, Jr.
*Attorney*—Waters, Roditi, Schwartz & Nissen

[57] ABSTRACT

A tail rotor of a helicopter comprising a hub with at least two blades hinged to it, each blade having a sweep angle selected in combination with transverse displacement, and a rod controlling the collective pitch of the rotor, said rod carrying an articulated blade-pitch control means.

3 Claims, 8 Drawing Figures

TAIL ROTOR OF A HELICOPTER

The present invention relates to rotary wing aircraft and more specifically it relates to helicopter tail rotors.

Known in the art is a helicopter tail rotor comprising a hub and at least two blades. Each blade can rotate about two hinges, viz, a feathering hinge which allows changing the blade angle, and a flapping hinge allowing the blade to move in the flapping plane without blade root bending. The blade rotation for simultaneous changing the blade angle (collective pitch of the rotor) is accomplished by a control rod whose outer end has a rigidly mounted device for blade pitch control, this device being connected by links with each blade.

In the known tail rotor which has flapping and, sometimes, drag hinges, the hinge bearings are subjected to great centrifugal forces which calls for making heavy hubs of complicated design. Therefore, it is expedient that each blade of the rotor should be connected to the hub by the feathering hinge alone.

The tail rotor with this type of blade mounting is referred to as a rigid rotor.

However, under the conditions of oblique flow, the rigid rotor is subjected to considerable alternating bending and static stresses at the blade root, the former being so high as to call for the introduction of some devices intended to reduce them.

Known in the art is a rigid rotor (see U.S. Pat. No. 3,106,964, Oct. 15, 1963) provided with a gyroscope in the form of a rotating swashplate with rigidly attached arms carrying masses at their ends. The rotor blades are rigidly connected to the body of the feathering hinge at a certain sweep angle. The collective pitch control of the rotor and positive control of the cyclic pitch are performed by means of a gyroscope connected at one side by articulated rods and blade horns with the feathering hinge bodies, while at the other side they are connected via an articulated control mechanism comprising flexible elements, with control sticks in the cockpit.

Another known rigid helicopter rotor (see U.S. Pat. No. 3,135,334, June 1, 1964) has rods rigidly connected to each blade and protruding forward from the blade root in the direction of rotation at an acute angle to the feathering axis. Each rod is provided at the end with a mass having an aerodynamic surface. The axis of the centers of pressure of each blade is arranged at a slight angle to its feathering axis. The blade controlling forces are transmitted from the swashplate mounted on the rotor drive shaft to the horns connected with the blade roots via special springs which hold the blades at a zero angle of attack at low main rotor r.p.m.

The static bending stresses originated in the rigid rotor in the minimum rigidity plane of the blade root are proportional to the rotor thrust. These stresses cannot be eliminated by selecting an appropriate blade coning angle since this angle in the tail rotor varies within broad limits because the rotor thrust direction can be reversed.

The main object of the present invention resides in providing a tail rotor with the blades so fastened to the hub body that each blade can rotate only about the axis of its feathering hinge. This design of the tail rotor is simpler than the one in which the blades are articulated to the hub.

Another object of the present invention is to provide a rigid tail rotor with a considerably lower alternating bending stresses in the minimum rigidity plane of the blade roots owing to self-setting of the cyclic pitch without the use of gyroscopes, arms, etc. The blade instability (divergence or flutter) is eliminated in this design owing to the fact that a small diameter tail rotor can have very rigid blades without a considerable weight penalty and owing to an appropriate transverse displacement of the blade axis, and proper blade c.g. location.

Still another object of the present invention resides in providing a rigid tail rotor in which the static bending stresses in the blades could be eliminated without the provision of the design coning angle.

Figure 3:
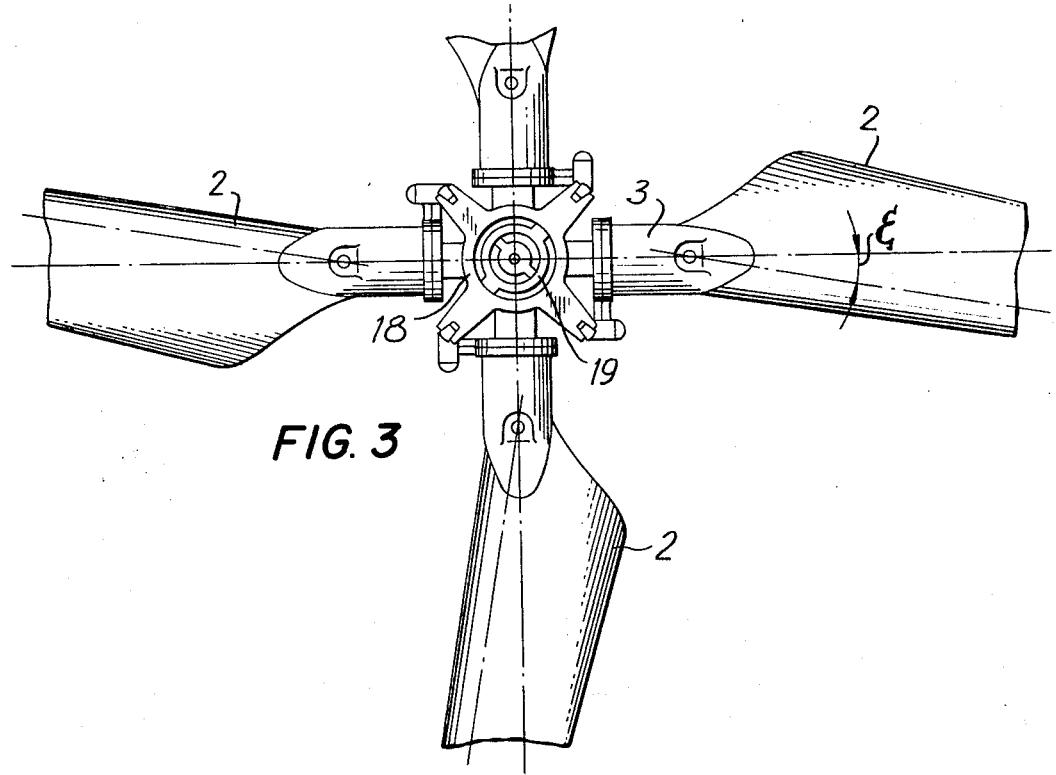
Figure 2:
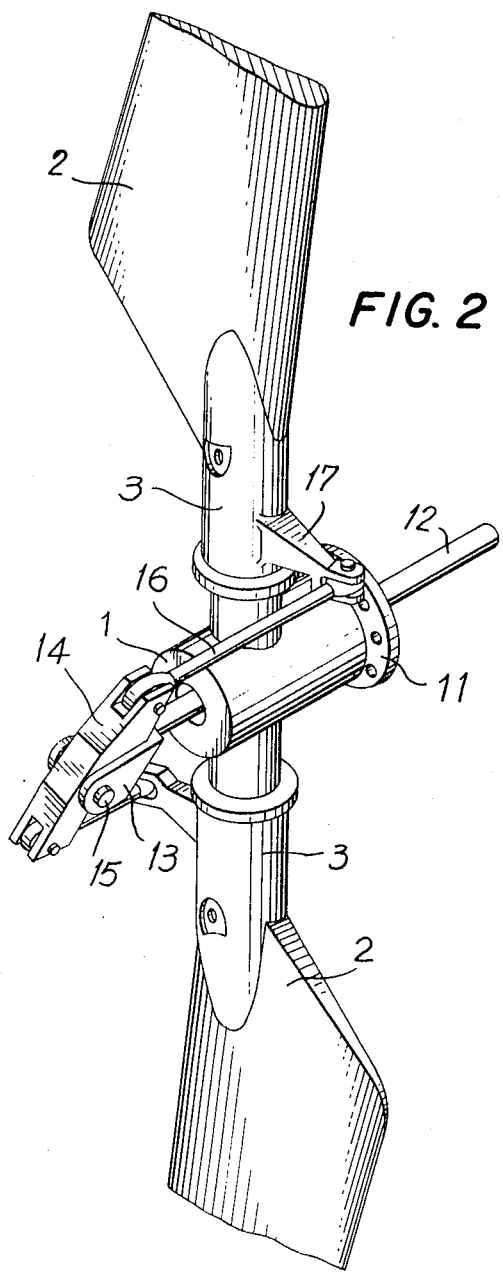
Figure 4:
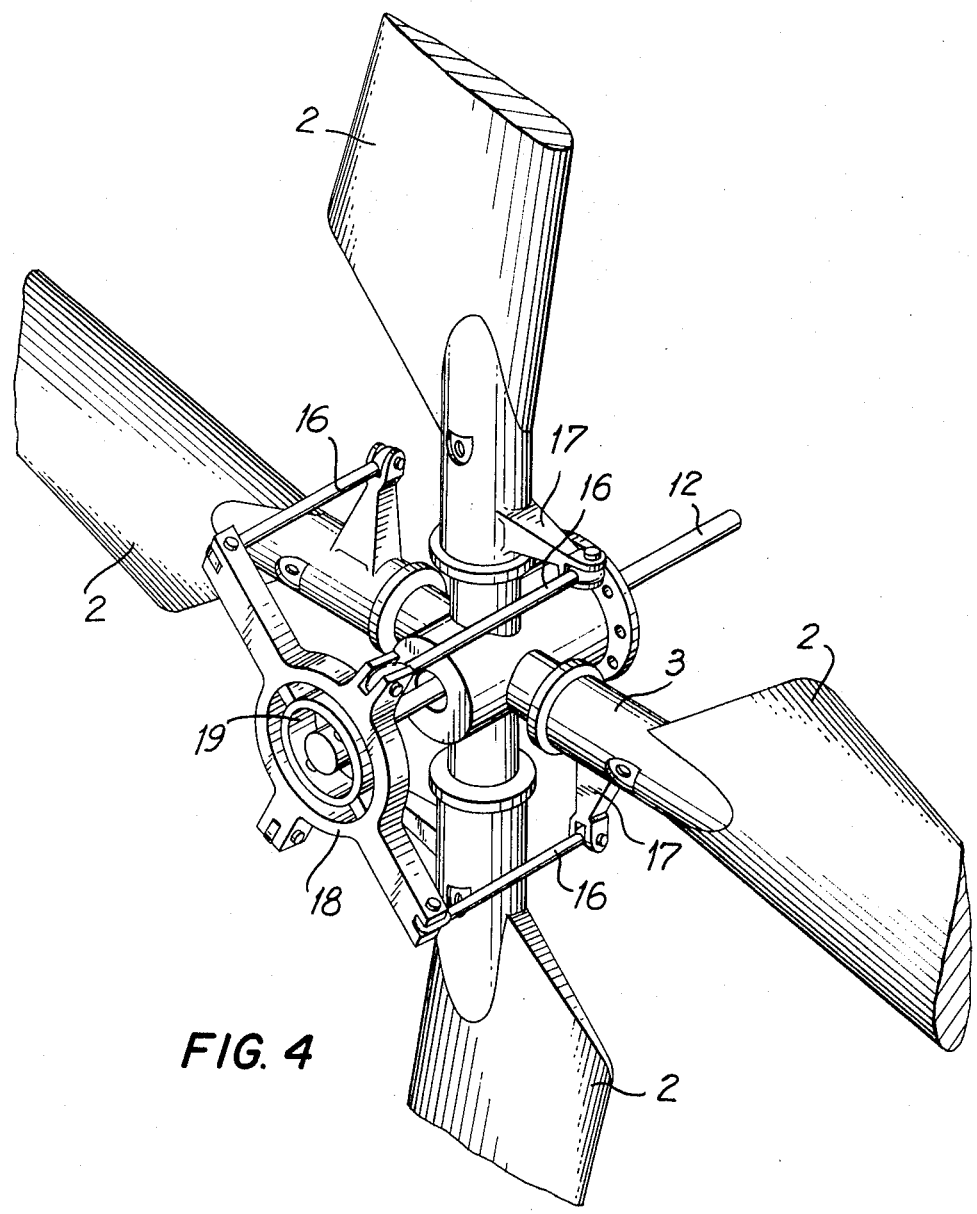
Figure 5:
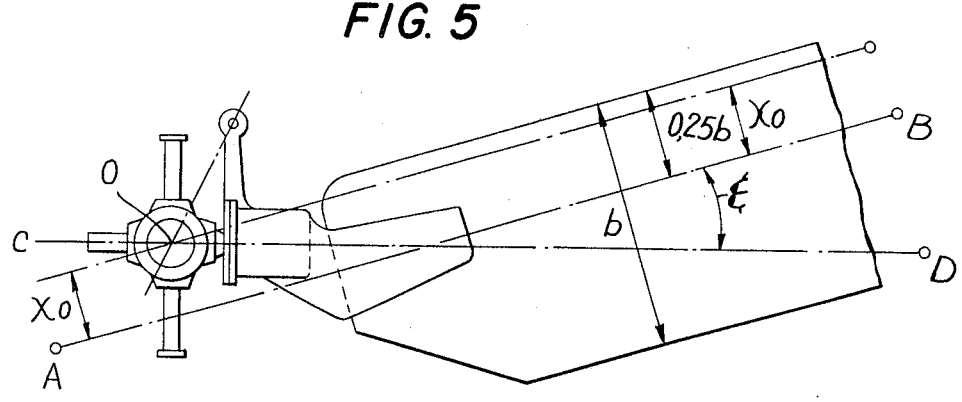
Figure 6:
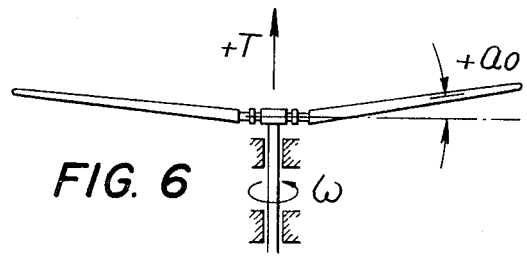
Figure 7:
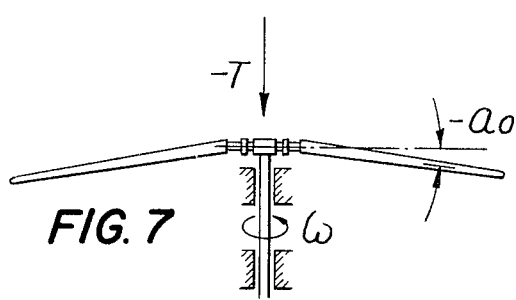
Figure 8:
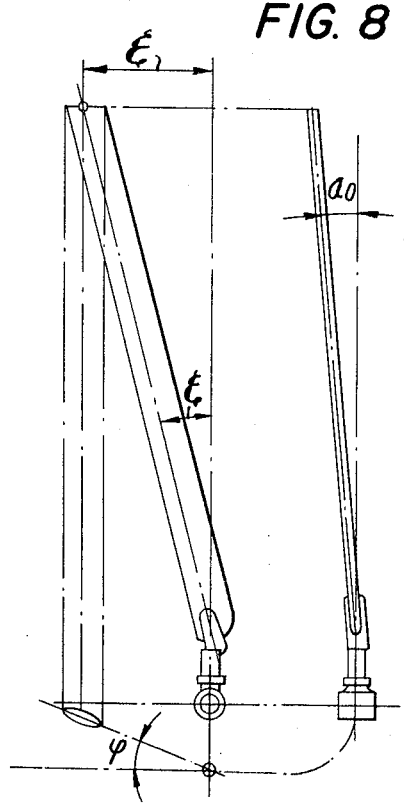

Other objects and advantages of the present invention will become apparent from the description that follows, and the accompanying drawings in which:

FIG. 1 is a top view of a two-blade rigid tail rotor;
FIG. 2 shows an isometric view of the same;
FIG. 3 is a top view of a four-blade rigid tail rotor;
FIG. 4 shows an isometric view of the same;
FIG. 5 is an enlarged view of the blade root;
FIG. 6 is a diagram of the blades with sweep angles and a positive direction of tail rotor thrust;
FIG. 7 is the same with the negative direction of thrust;
FIG. 8 is a diagram showing the origination of a blade coning angle during the flapping motion of the blade, having a certain sweep angle.

A two-blade tail rotor of the helicopter comprises a hub 1 (FIGS. 1 and 2) to which blades 2 are secured by means of feathering hinges 3. The body 4 of the hinge 3 is installed in bearings 5 and 6 on a spindle 7. The bearings of the feathering hinge provide only one degree of freedom for the blade which allows it to rotate with relation to the longitudinal axis of the hinge, thereby changing the blade angle.

The spindle 7 of the feathering hinge is made integral with the hub 1.

The centrifugal force acting on each rotating blade 2 is taken by a flexible torsion member 8 one end of which is fastened by a pin 9 to the blade root while the other one is secured to the hub 1 by a pin 10.

The flange 11 of the hub 1 is rigidly fastened to a tubular shaft (not shown) of the tail gearbox. Passing inside the hub 1 and said tail gearbox shaft is the rod 12 controlling the collective pitch of the rotor and connected with the pilot controls.

The outer end of the rod 12 has a fork 13 which carries a rocker arm 14 for the pitch control of the blades 2. The rod 12 is connected with the rocker arm 14 by means of a hinge 15 which allows the rocker arm 14 to be freely tilted with relation to the control rod 12.

The collective pitch of the rotor is controlled by the rod 12 via links 16 articulated to the rocker arm 14 and to the blade pitch control means 16 fastened to the body 4 of the hinge 3.

In a four-blade rigid tail rotor the blade pitch control means is made in the form of a spider 18 (FIGS. 3 and 4) installed on the outer end of the rod 12. The spider 18 has four radially directed arms (corresponding to the number of blades) to the ends of which rods 16 are articulated. The other ends of said rods are articulated to the blade pitch control means 17. The control rod 12 is connected to the spider 18 by a universal joint 19 so that the spider 18 can tilt with relation to the rod 19. The blades 2 are fastened to the body of the feathering hinge 3 at an angle $\xi$ included between axis AB of the blade (FIG. 5) and axis CD of the feathering hinge, and forming a sweep angle $\xi$ in the plane of the rotor rotation.

(Axis AB is parallel to the leading edge of the blade and is located at a distance of $0.25b$ from it where $b$ is the blade chord).

The claimed rotor may have any number of blades. In all the cases (except a two-blade version) the spider 18 is connected to the rod by a universal joint.

Axis AB of each rotor blade is displaced in a direction perpendicular to it through a certain distance $X_o$ called transverse displacement and measured between axis AB and rotor axis of rotation O.

The sweep angle $\xi$ may be both positive and negative. The only requirement is that balancing of the blade (location of the centers of gravity, centers of pressure and of the feathering high axis) should be selected so that, at a given sweep angle and a disconnected pitch control system (free turning in the feathering hinge) the blade would be stable and have a sufficient flutter and divergence margin. This requirement should by all means be satisfied. Efficient balancing can be achieved by correct selection of two design parameters, viz, sweep angle $\xi$ and transverse displacement $X_o$ (FIG. 5).

Articulated fastening of the rocker arm 14 (FIGS. 1 and 2) or spider 18 (FIGS. 3 and 4) ensures normal control of the rotor collective pitch. Control of the cyclic pitch remains free so that the blade 2 will move in such a manner that the first harmonic and a number of higher harmonics of the hinge moment are equal to zero.

The first harmonic of the hinge moment $M_{h_1}$ and the first harmonic of the bending moment in the blade root $M_{b_1}$ are interrelated as follows:

$$M_{h_1} = M_{b_1} x \xi$$

Therefore, if $M_{h_1} \cong 0$ then $M_{b_1} \cong 0$, just what is required. (The forces of friction in the hinge and the resilience of the torsion member may be neglected). The same reasoning can be applied to the harmonics of the order $Z-1$ and $Z+1$ where $Z$ is the number of the tail rotor blades.

Thus, the device considered here ensures a cyclic change of the blade angle in which the first harmonic and the harmonics of the order $Z-1$ and $Z+1$ of the bending moment are equal to zero.

When a static load is applied to a blade of an articulated rotor rotating at an angular speed $\omega$ (FIG. 6) and developing a thrust T. The blades are set at a coning angle $\alpha_o$. When the magnitude and, moreover, direction of the rotor thrust is changed to $-T$ (FIG. 7) the sign of the coning angle $\alpha_o$ is changed too. In the rotor with rigidly fastened blades the resultant of the centrifugal force and the force of thrust of each blade will produce a blade-bending moment.

In accordance with the present invention the sweep angle $\xi$ (FIG. 8) can be selected so that for each value $\phi$ of the rotor pitch the required coning angle $\alpha_o$ will be produced, equal to $\alpha_o = \phi \xi$ At such a sweep angle the resultant of the centrifugal force and thrust will be directed along the blade axis without imposing static bending stresses in its root portion.

The sweep angle $\xi$ can also be selected so as not to eliminate the static bending moment completely but only to reduce it to an allowable value.

Thus, correct selection of the sweep angle $\xi$ in combination with the transverse displacement $X_o$ makes it possible to eliminate or reduce both the alternating and steady bending stresses in the minimum rigidity plane of the blade root without resorting to the use of a special control gyroscope.

The design described above can be employed in any helicopter rotor which does not require positive control of the cyclic pitch. Therefore, this design is always applicable to the tail rotor of a single-rotor helicopter.

The described system can also be used for the main rotor when control of the helicopter does not require the positive control of the cyclic pitch, for example in single-rotor helicopters and in such rotor craft which are steered by some additional devices such as rudders, tractor or pusher propellers, reaction jets, etc., and in multirotor helicopters which can be steered by changing the rotor collective pitch alone.

Described above is a preferable embodiment of the invention and it must be understood that other embodiments within the scope of the invention may occur to those skilled in the art.

The tail rotor of a helicopter and the functioning of its parts have been described with a view to disclosing how the objects mentioned above are achieved. Having described these parts we hereby claim the following combinations and their equivalents as our invention.

We claim:

1. In a tail rotor system of a helicopter, the combination of a drive shaft for said tail rotor, a rotor hub having feathering hinges, said hub being rigidly attached to said drive shaft; at least two rotor blades, each said blade being connected to said hub and adapted to turn only about the axis of a respective feathering hinge; a flexible torsion member for absorbing the centrifugal load applied to each rotor blade, said torsion member being positioned between each said blade and the hub; a rod for controlling the collective pitch of said tail rotor; means on said control rod for turning the blades; and links for connecting said blade-turning means with each said blade; the improvement comprising: each said rotor blade being attached to said hub at a sweep angle determined in combination with a transverse displacement; and hinge means connecting the blade-turning means with the control rod for controlling the collective pitch of the tail rotor; said hinge means providing a free inclination of blade-turning means with respect to said control rod.

2. In a tail rotor of a helicopter, comprising; a drive shaft for said tail rotor; a rotor hub having feathering hinges mounted on said drive shaft; two rotor blades, each said blade being connected to said hub and being capable of turning about the axis of a respective feathering hinge; a flexible torsion member for absorbing the centrifugal load applied to the blade being positioned between each said blade and the hub; a rod for controlling the collective pitch of the tail rotor; a rocker arm on said control rod for turning the blades; and links for connecting said rocker arm to each said blade, the improvement comprising; each said blade being attached to said hub at a sweep angle determined in combination with a transverse displacement; and a joint; said joint connecting said rocker arm to the control rod for controlling the collective pitch of the rotor and providing the inclination of said rocker arm with respect to said rod.

3. In a tail rotor of a helicopter, comprising; a drive shaft for said tail rotor; a rotor hub mounted on said drive shaft; a plurality of rotor blades in excess of two; each said blade being connected to said hub and capable of turning about the longitudinal axis thereof; a flexible torsion member absorbing the centrifugal load applied to the blade and installed between each blade and the hub; a rod for controlling the collective pitch of the tail rotor; a blade-turning spider installed at an external end of said control rod; and links for connecting said spider to each blade; the improvement comprising; each said blade being attached to said hub at a sweep angle determined in combination with the transverse displacement; and a universal joint; said universal joint connecting said spider to said rod for controlling the collective pitch of the tail rotor and providing the inclination of said spider with respect to said rod.

* * * * *